United States Patent
Kawabayashi

(10) Patent No.: US 10,949,713 B2
(45) Date of Patent: Mar. 16, 2021

(54) IMAGE ANALYZING DEVICE WITH OBJECT DETECTION USING SELECTABLE OBJECT MODEL AND IMAGE ANALYZING METHOD THEREOF

(71) Applicant: CANON KABUSHIKI KAISHA, Tokyo (JP)

(72) Inventor: Hisashi Kawabayashi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 16/255,541

(22) Filed: Jan. 23, 2019

(65) Prior Publication Data

US 2019/0251391 A1    Aug. 15, 2019

(30) Foreign Application Priority Data

Feb. 13, 2018  (JP) .............................. JP2018-023407

(51) Int. Cl.
*G06K 9/62* (2006.01)
*G06K 9/00* (2006.01)
*G06K 9/20* (2006.01)

(52) U.S. Cl.
CPC ....... *G06K 9/6253* (2013.01); *G06K 9/00268* (2013.01); *G06K 9/00362* (2013.01); *G06K 9/2081* (2013.01); *G06K 9/00771* (2013.01)

(58) Field of Classification Search
CPC ............. G06K 9/6253; G06K 9/2081; G06K 9/00268; G06K 9/00362; G06K 9/00771
See application file for complete search history.

(56) References Cited

U.S. PATENT DOCUMENTS

| 8,831,330 B2 | 9/2014 | Fujikawa et al. | G06T 7/0002 |
| 2012/0062600 A1* | 3/2012 | Fukasawa | G06K 9/00771 |
| | | | 345/660 |
| 2012/0314044 A1* | 12/2012 | Ogawa | G06K 9/00221 |
| | | | 348/77 |
| 2012/0314932 A1* | 12/2012 | Nakayama | G06T 7/77 |
| | | | 382/154 |
| 2012/0328153 A1* | 12/2012 | Yu | G06K 9/00771 |
| | | | 382/103 |
| 2013/0343640 A1* | 12/2013 | Buehler | B25J 9/163 |
| | | | 382/155 |

(Continued)

FOREIGN PATENT DOCUMENTS

| JP | 2010-191939 | 9/2010 |
| JP | 2014-199506 | 10/2014 |

*Primary Examiner* — Ming Y Hon
(74) *Attorney, Agent, or Firm* — Venable LLP

(57) ABSTRACT

An image analyzing device comprises: a detection unit configured to execute detection processing for detecting a predetermined object included in an image, using a plurality of different object models that are for detecting the predetermined object; a display control unit configured to control a display to display information indicating each of the plurality of different object models and information indicating each of results of the detection processing related to each of the plurality of different object models; a reception unit configured to receive selection of at least one object model from among the plurality of different object models which are pieces of information displayed by the display control unit; and a setting unit configured to set an object model to be used in the detection processing, based on the selection received by the reception unit.

8 Claims, 12 Drawing Sheets

(56) References Cited

U.S. PATENT DOCUMENTS

| | | | |
|---|---|---|---|
| 2015/0286896 A1* | 10/2015 | Watanabe | G06F 16/5854 |
| | | | 382/103 |
| 2015/0362989 A1* | 12/2015 | Tyagi | H04N 5/33 |
| | | | 345/156 |
| 2016/0180195 A1* | 6/2016 | Martinson | G06K 9/6202 |
| | | | 382/103 |
| 2016/0260226 A1* | 9/2016 | Yano | G06T 7/277 |
| 2017/0206441 A1* | 7/2017 | Miyano | G06K 9/66 |
| 2017/0270375 A1* | 9/2017 | Grauer | G06K 9/6293 |
| 2018/0350144 A1* | 12/2018 | Rathod | G06Q 20/3276 |

\* cited by examiner

IMAGE ANALYZING DEVICE WITH OBJECT DETECTION USING SELECTABLE OBJECT MODEL AND IMAGE ANALYZING METHOD THEREOF

BACKGROUND OF THE INVENTION

Field of the Invention

The present invention relates to an image analyzing device and an image analyzing method.

Description of the Related Art

Processing for detecting an object from video images and still images is known (e.g., see Japanese Patent Laid-Open No. 2010-191939). However, such object detection processing takes time. This is because template matching is performed with multiple object models. Although more object models are required to improve accuracy, processing speed drops since the frequency with which template matching is performed increases. In other words, there is a trade-off between accuracy and speed.

The object models to be used in detection will be naturally decided once the installation environment of an image capturing device is decided. For example, detection will be performed with an object model taken from above in the case of an angle of view with a high depression angle, and with an object model approximately from the front in the case of an angle of view with a low depression angle. Taking advantage of this feature, it is possible to speed up processing by removing any unnecessary object models from detection. However, an object is, on rare occasion, detected with an object model other than the expected model, and it may not be appropriate to blanketly delete certain object models. Also, the tendencies of the object model to be used in detection change depending on the installation environment.

On the other hand, the installation environment and use case differ from user to user, as does the question of whether to place emphasis on accuracy or speed. In view of this, if the user is able to judge and select object models from the viewpoint of balancing the accuracy and speed that is sought, with a view to the situation of object detection using the object model, it will be possible to tune accuracy and speed on a use case basis.

SUMMARY OF THE INVENTION

An aspect of the present invention is to present a technology that is able to present the results of object detection using object models to a user in an intelligible manner, and to support changes made by the user to the object models to be used in object detection.

An aspect of the present invention is provided with the following configuration.

An image analyzing device comprising: a detection unit configured to execute detection processing for detecting a predetermined object included in an image, using a plurality of different object models that are for detecting the predetermined object; a display control unit configured to control a display to display information indicating each of the plurality of different object models and information indicating each of results of the detection processing related to each of the plurality of different object models; a reception unit configured to receive selection of at least one object model from among the plurality of different object models which are pieces of information displayed by the display control unit; and a setting unit configured to set an object model to be used in the detection processing, based on the selection received by the reception unit, wherein the plurality of different object models that are used in the detection processing include at least two object models among an object model corresponding to the predetermined object facing in a first direction, an object model corresponding to the predetermined object facing in a second direction different from the first direction, an object model corresponding to a first portion of the predetermined object, an object model corresponding to a second portion of the predetermined object different from the first portion, and an object model corresponding to an entirety of the predetermined object.

According to an aspect of the present invention, it is possible to present the results of object detection using object models to a user in an intelligible manner, and to support changes made by the user to the object models to be used in object detection.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, the same reference signs are given to constituent elements, members and processing shown in the diagrams that are the same or equivalent, and redundant description will be omitted as appropriate. Also, some members that are not important to the description have been omitted in the diagrams that are displayed.

In the embodiments, in detection of objects from images taken by a camera, the percentage of the processing time and the percentage of the detection number that each of a plurality of different object models requires are calculated and displayed on a model setting screen. On this model setting screen, a user is made to select an object model to be used in detection from a plurality of object models that are displayed. Through the display of the model setting screen, the user is able to know how much a certain object model contributes to detection and how much processing time is taken overall. Through the percentage of the processing time and the percentage of the detection number that is displayed, the user is able to select an object model to be used in detection in accordance with his or her own requirements.

First Embodiment

In a first embodiment, the object that is detected is a human body. An image analyzing device according to the present embodiment monitors and analyzes video images. The image analyzing device performs human body detection on video images obtained by an image capturing device, calculates the percentage of the processing time and the percentage of the detection number that each human body model requires, and displays the calculation results on a model setting screen. The user is made to select a human body model to be used in detection from the plurality of displayed human body models on this model setting screen.

Figure 1:
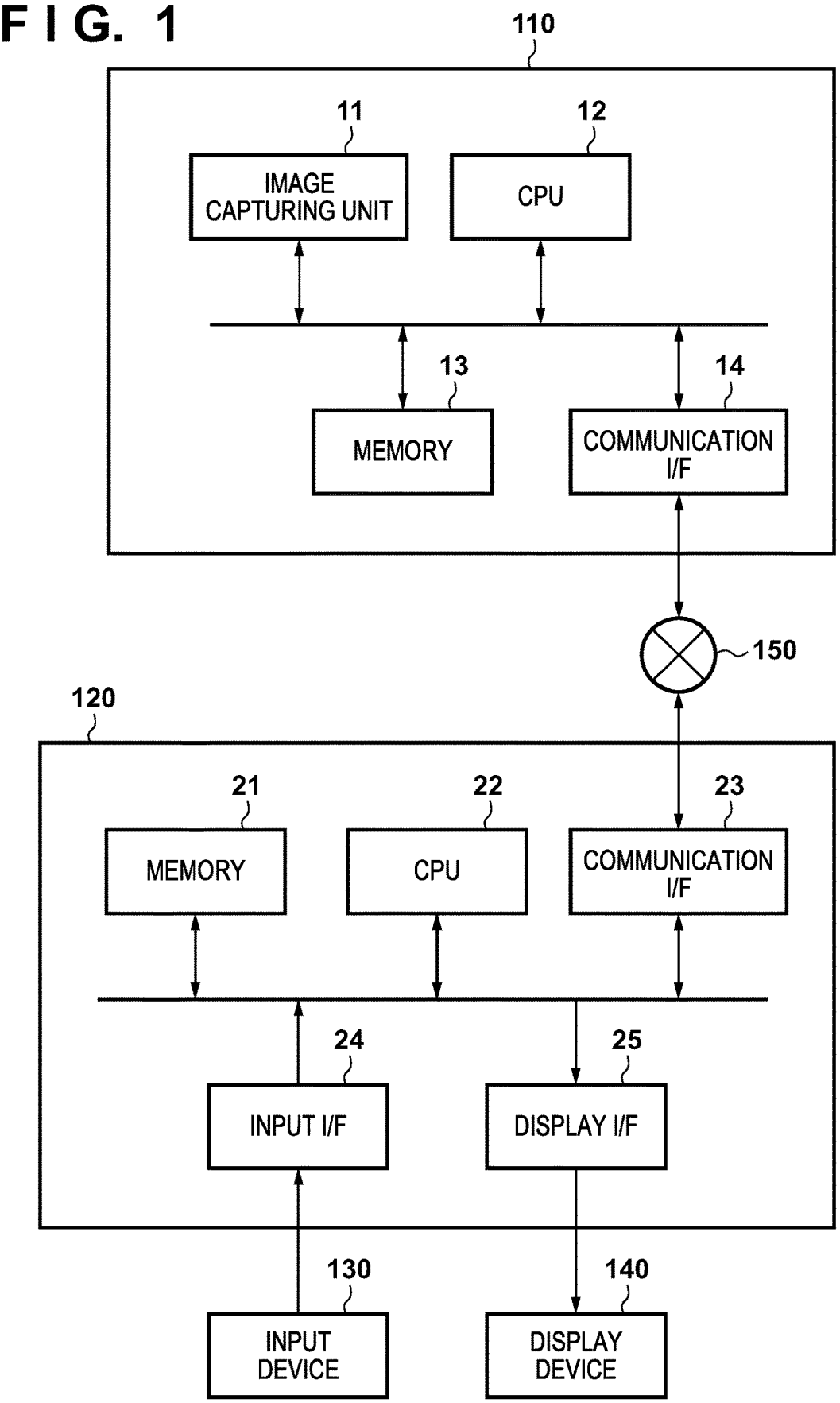
FIG. 1 is a schematic diagram showing an example of the system configuration and hardware configuration of a system according to a first embodiment.

FIG. 1 is a schematic diagram showing an example of the system configuration and hardware configuration of a system according to the present embodiment. An image capturing device 110 is a network camera or a surveillance camera, and is installed at a predetermined location in the real world, such as a ceiling, an entrance or an outer wall, for example. The image capturing device 110 performs image capturing. In other embodiments, the image capturing device 110 may be an image capturing device incorporated in a mobile terminal such as a smartphone, a tablet or a laptop PC. A client device 120 serving as an image analyzing device drives the image capturing device 110 and displays images captured with the image capturing device 110 (hereinafter, also referred to as captured images). An input device 130 is constituted by a mouse, a keyboard and the like, and is used in order to perform user input to the client device 120. A display device 140 is constituted by a display and the like, and displays images generated by the client device 120. In FIG. 1, the client device 120 and the display device 140 are each shown as an independent device, but the client device 120 and the display device 140 may be constituted in an integrated manner. Also, the input device 130 and the display device 140 may be constituted in an integrated manner, or the client device 120, the input device 130 and the display device 140 may be constituted in an integrated manner.

A network 150 connects the image capturing device 110 and the client device 120. The network 150 is a local network, for example, and is constituted by a plurality of routers, switches, cables and the like that meet communication standards. In the present embodiment, as long as communication between the image capturing device 110 and the client device 120 is enabled, any communication standards, scale and configuration may be applied. For example, the network 150 may be constituted by the Internet, a wired LAN (Local Area Network), a wireless LAN (Wireless LAN), a WAN (Wide Area Network) or the like. Also, the number of image capturing devices 110 that are connected to the client device 120 is not limited to one, and may be two or more.

A hardware configuration of the image capturing device 110 will be described. The image capturing device 110 includes an image capturing unit 11, a CPU 12, a memory 13 and a communication I/F 14 as hardware configuration. The image capturing unit 11 has an image sensor and an optical system of a subject provided on the image sensor, and performs image capturing on the image sensor under the control of the CPU 12, with the intersection point between the image sensor and an optical axis of the optical system as an image capturing center. The image sensor may be a CMOS (Complementary Metal-Oxide Semiconductor) image sensor, a CCD (Charged Coupled Device) image sensor, or the like. The CPU 12 controls the entirety of the image capturing device 110. The memory 13 stores programs, images captured by the image capturing unit 11, data that is utilized when the CPU 12 executes processing, and the like. The communication I/F 14 controls communication with the client device 120 performed via the network 150 under the control of the CPU 12. The functions of the image capturing device 110 and the like are realized, by the CPU 12 executing processing based on programs stored in the memory 13.

Next, the hardware configuration of the client device 120 will be described. The client device 120 includes a memory 21, a CPU 22, a communication I/F 23, an input I/F 24 and a display I/F 25 as hardware configuration. The CPU 22 controls the entirety of the client device 120. The memory 21 stores programs, captured images transmitted from the image capturing device 110, data that is utilized when the CPU 22 executes processing, and the like. The communication I/F 23 controls communication with the image capturing device 110 performed via the network 150 under the control of the CPU 22. The input I/F 24 connects the client device 120 and the input device 130, and controls the input of information from the input device 130. The display I/F 25 connects the client device 120 and the display device 140, and controls the output of information to the display device 140. The functions of the client device 120, the processing of flowcharts described later and the like are realized, by the CPU 22 executing processing based on programs stored in the memory 21. The hardware configuration of the client device 120 is, however, not limited to that shown in FIG. 1. For example, the client device 120 may have an audio output device such as a speaker which is an example of a notification device. In the case where the client device 120 has an audio output device as hardware configuration, an example of notification processing is output processing of audio such as warnings.

Figure 2:
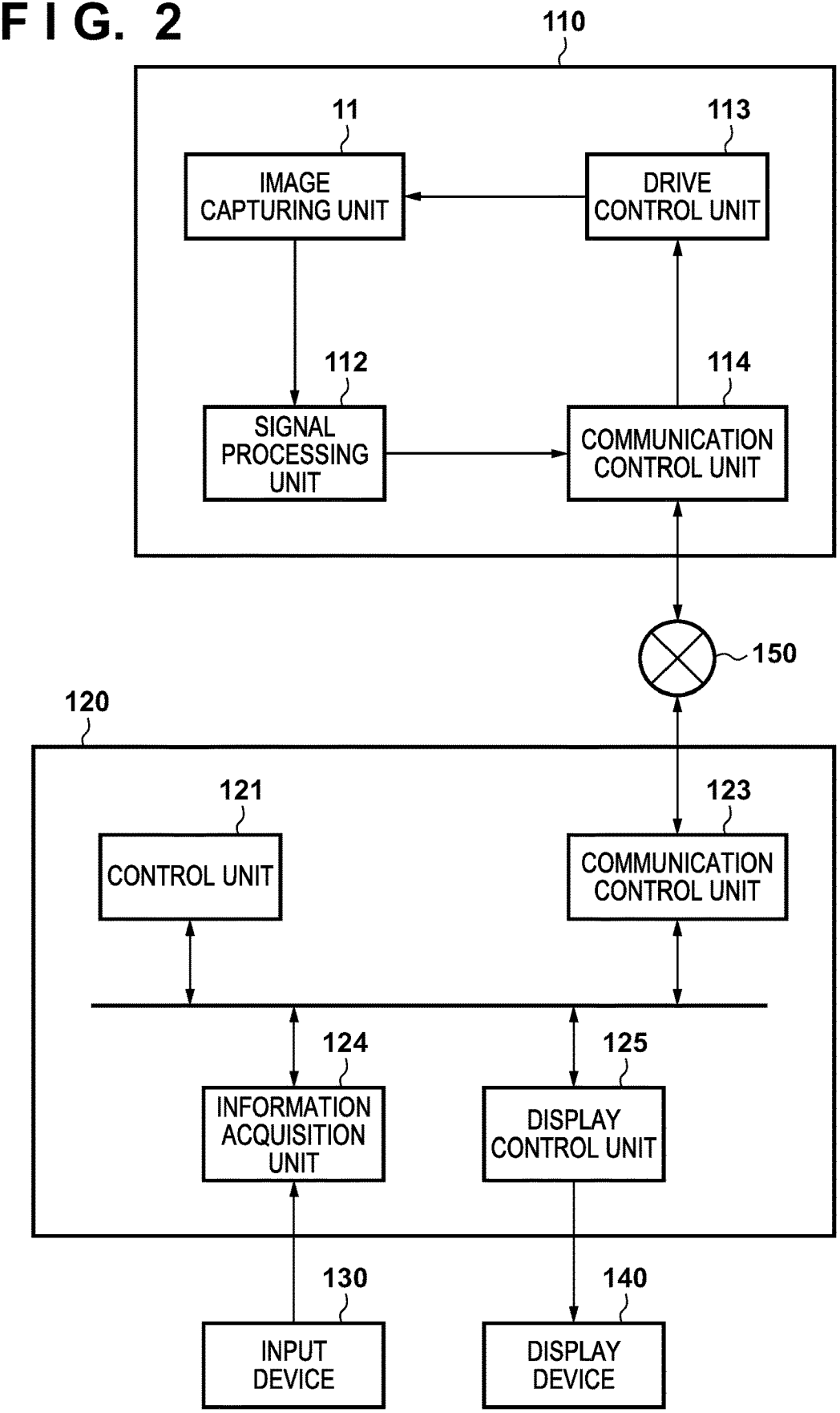
FIG. 2 is a block diagram showing the functions and configuration of an image capturing device and a client device in FIG. 1.

FIG. 2 is a block diagram showing the functions and configuration of the image capturing device 110 and the client device 120 of FIG. 1. Each block shown here can be realized by an element or mechanical device including the CPU of a computer in a hardware manner or by a computer program or the like in a software manner, and functional blocks that are realized through cooperation between these constituent elements are depicted here. Accordingly, a person skilled in the art who came into contact with the present specification will understand that these functional blocks can be realized in various forms through a combination of hardware and software.

The image capturing device 110 includes the image capturing unit 11, a signal processing unit 112, a drive control unit 113 and a communication control unit 114. The signal processing unit 112 processes the signals of images captured by the image capturing unit 11. For example, the signal processing unit 112 encodes images captured by the image capturing unit 11. The signal processing unit 112 can use JPEG (Joint Photographic Experts Group), for example, as the encoding method. Alternatively, the signal processing unit 112 can use H.264/MPEG-4 AVC as the encoding method. Alternatively, the signal processing unit 112 can use HEVC (High Efficiency Video Coding) as the encoding method. The encoding method is, however, not limited thereto. Also, the signal processing unit 112 may be configured to perform encoding after selecting an encoding method from a plurality of encoding methods. The drive control unit 113 performs control for changing the image capturing direction and angle of view of the image capturing unit 11. Although the present embodiment describes the case where the image capturing unit 11 is able to change the image capturing direction in the pan direction and the tilt direction and to change the image capturing angle of view, the present invention is not limited thereto. The image capturing device 110 not need have a function of changing the image capturing direction in the pan direction and the tilt direction, and not need have a function of changing the angle of view. The communication control unit 114 transmits captured images processed by the signal processing unit 112 to the client device 120. Furthermore, the communication control unit 114 receives control commands for the image capturing device 110 from the client device 120.

The client device 120 includes a control unit 121, a communication control unit 123, an information acquisition unit 124 and a display control unit 125. The control unit 121 controls the client device 120. The communication control unit 123 acquires captured images from the image capturing device 110. The information acquisition unit 124 receives user inputs carried out on the input device 130 or acquires input information from the input device 130. The display control unit 125 generates images (e.g., video images, video, still images), outputs the generated images to the display device 140, and controls the display device 140 to perform display processing discussed later. The display device 140 performs notification to the user in the form of display, and thus may be understood as an example of a notification device.

Figure 3:
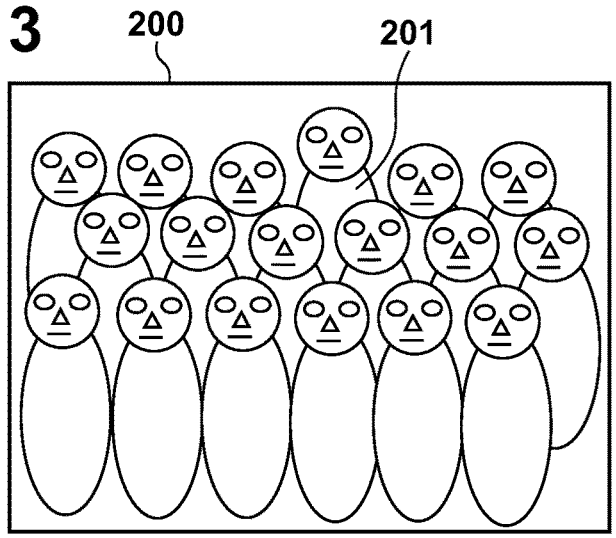
FIG. 3 is a diagram showing an example of a captured image acquired by the client device from the image capturing device.

FIG. 3 is a diagram showing an example of a captured image 200 acquired by the client device 120 from the image capturing device 110. A plurality of human bodies 201 are simultaneously captured in the captured image 200.

Returning to FIG. 2, the control unit 121 of the client device 120, in the case where a human body model to be used needs to be set, performs human body detection on the captured image acquired from the image capturing device 110, calculates the percentage of the processing time and the percentage of the detection number that each human body model requires, and controls the display device 140 to display the calculation results. The client device 120 makes the user select a human body model to be used in detection from the plurality of human body models that are displayed. Human body detection can thereby be performed on live video in real time, the percentage of the processing time and the percentage of the detection number can be displayed for each human body model, and the user can be made to select a human body model to be used in detection from the plurality of human body models that are displayed.

Note that, in other embodiments, the client device 120 may acquire a moving image that is saved in the image capturing device 110, perform human body detection on each frame, calculate the percentage of the processing time and the percentage of the detection number for each human body model, and control the display device 140 to display the calculation results. Alternatively, the client device 120 may perform human body detection on each frame of a moving image that is saved in the client device 120, calculate the percentage of the processing time and the percentage of the detection number for each human body model, and control the display device 140 to display the calculation results. Alternatively, the client device 120 may access a recording server or the like, perform human body detection on each frame of a moving image that is saved in the recording server, calculate the percentage of the processing time and the percentage of the detection number for each human body model, and control the display device 140 to display the calculation results.

Figure 4:
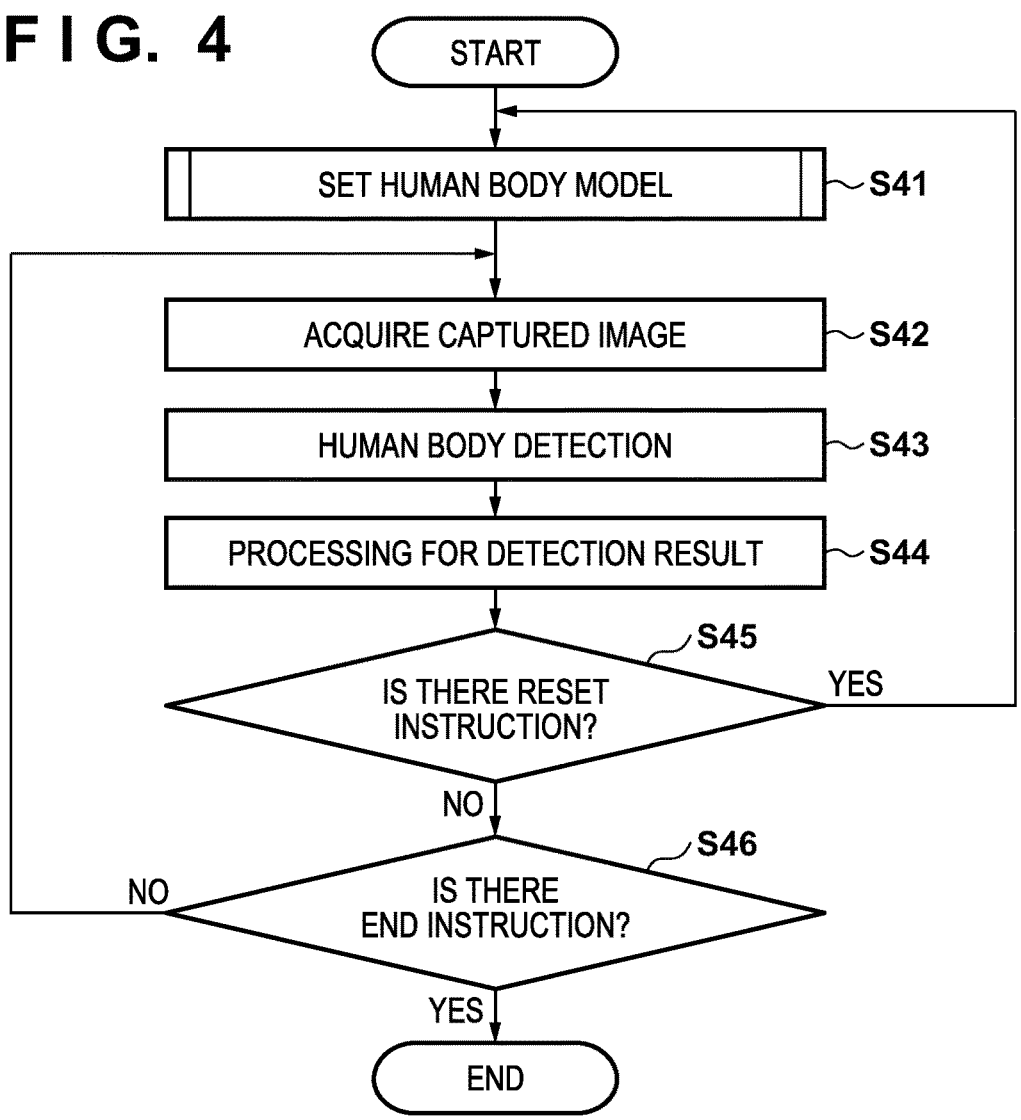
FIG. 4 is a flowchart showing the flow of a series of processing in the client device of FIG. 2.

FIG. 4 is a flowchart showing the flow of a series of processing in the client device 120 of FIG. 2. The control unit 121 sets the human body model to be used in human body detection (step S41). The control unit 121 detects a human body from a captured image, using at the least one human body model that is set to be used at that time. The display control unit 125 controls the display device 140 to display a model setting screen on which selectable human body models and detection results are displayed in association with each other. The information acquisition unit 124 acquires the result of a human body model selection by the user, and the control unit 121 newly sets the selected human body model as a human body model to be used in subsequent human body detection. Step S41 will be discussed in further detail later.

The communication control unit 123 acquires a captured image from the image capturing device 110 via the network 150 (step S42). The control unit 121 detects a human body from the captured image acquired in step S42, using the human body models set in step S41 (step S43). The control unit 121 performs predetermined processing on the detection result of step S43 (step S44). Predetermined processing is statistical processing such as, for example, generation of a screen for showing the detection result to the user and counting of the number of human bodies that is based on the detection result.

The control unit 121, in the case where an instruction to redo human body model setting is received from the user (YES in step S45), returns the processing to step S41. In the case where there is no such instruction (NO in step S45), the control unit 121 checks whether there is an end instruction (step S46). If there is an end instruction (YES in step S46), the processing ends, and if there is not (NO in step S46), the processing returns to step S42. In this way, the client device 120 is able to support initial setting of a human body model by the user, by performing human body detection on a captured image acquired from the image capturing device 110, and presenting a model setting screen that includes the detection result. Also, the client device 120 is able to enhance user convenience, by making it possible to redo human body model setting if needed, while continuing to perform human body detection on a captured image acquired from the image capturing device 110.

Figure 5:
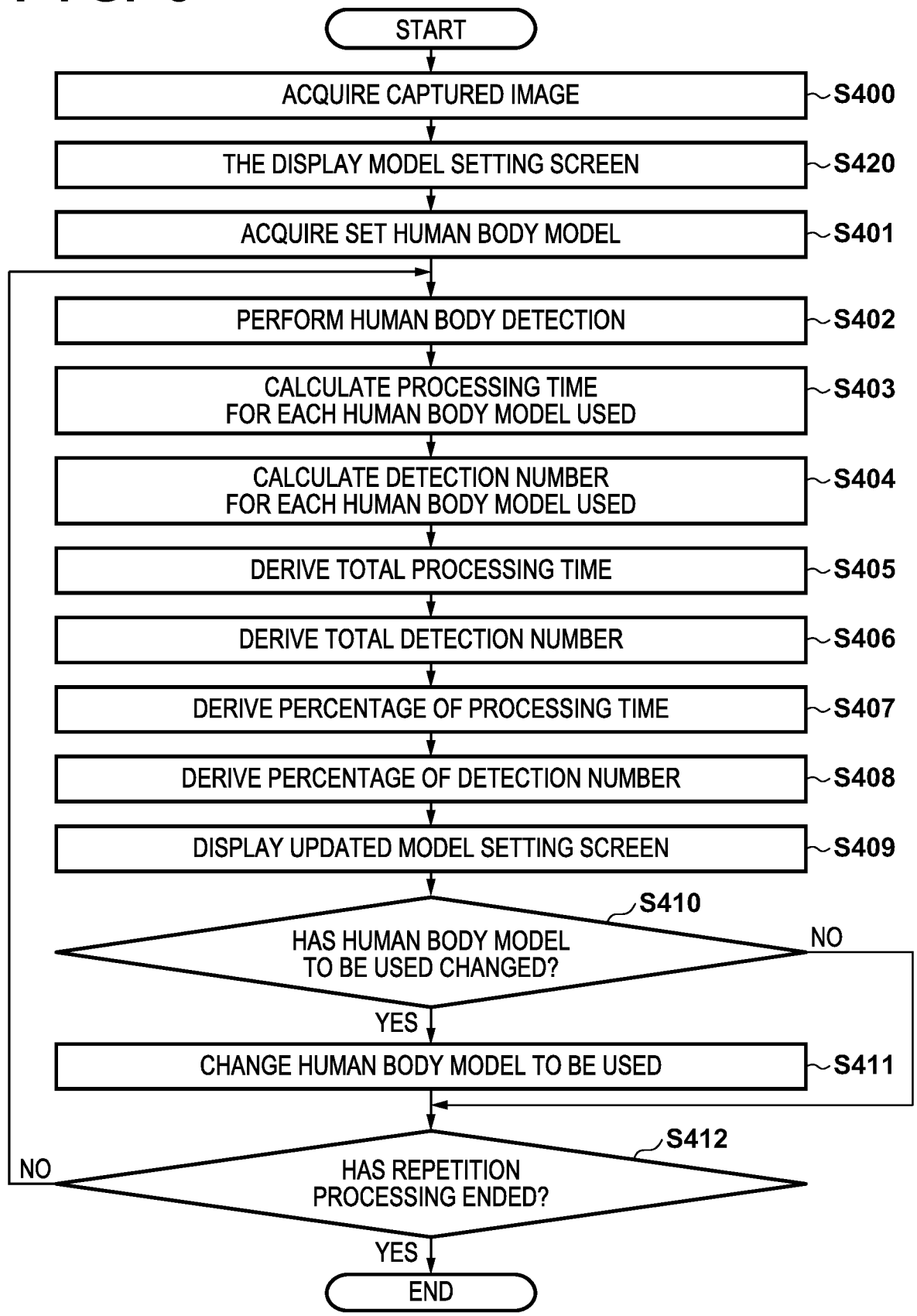
FIG. 5 is a flowchart showing the flow of a series of processing in a human body model setting step in FIG. 4.

FIG. 5 is a flowchart showing the flow of a series of processing in the human body model setting step S41 of FIG. 4. In step S41, the client device 120, in human body detection, controls the display device 140 to display the percentage of the processing time and the percentage of the detection number for each human body model, and makes the user select at least one human body model to be used in detection from the plurality of human body models that are displayed.

The control unit 121 acquires a captured image from the image capturing device 110 via the network 150 (step S400). The display control unit 125 generates a model setting screen 300 using the captured image acquired in step S400, and controls the display device 140 to display the generated model setting screen (step S420).

Figure 6:
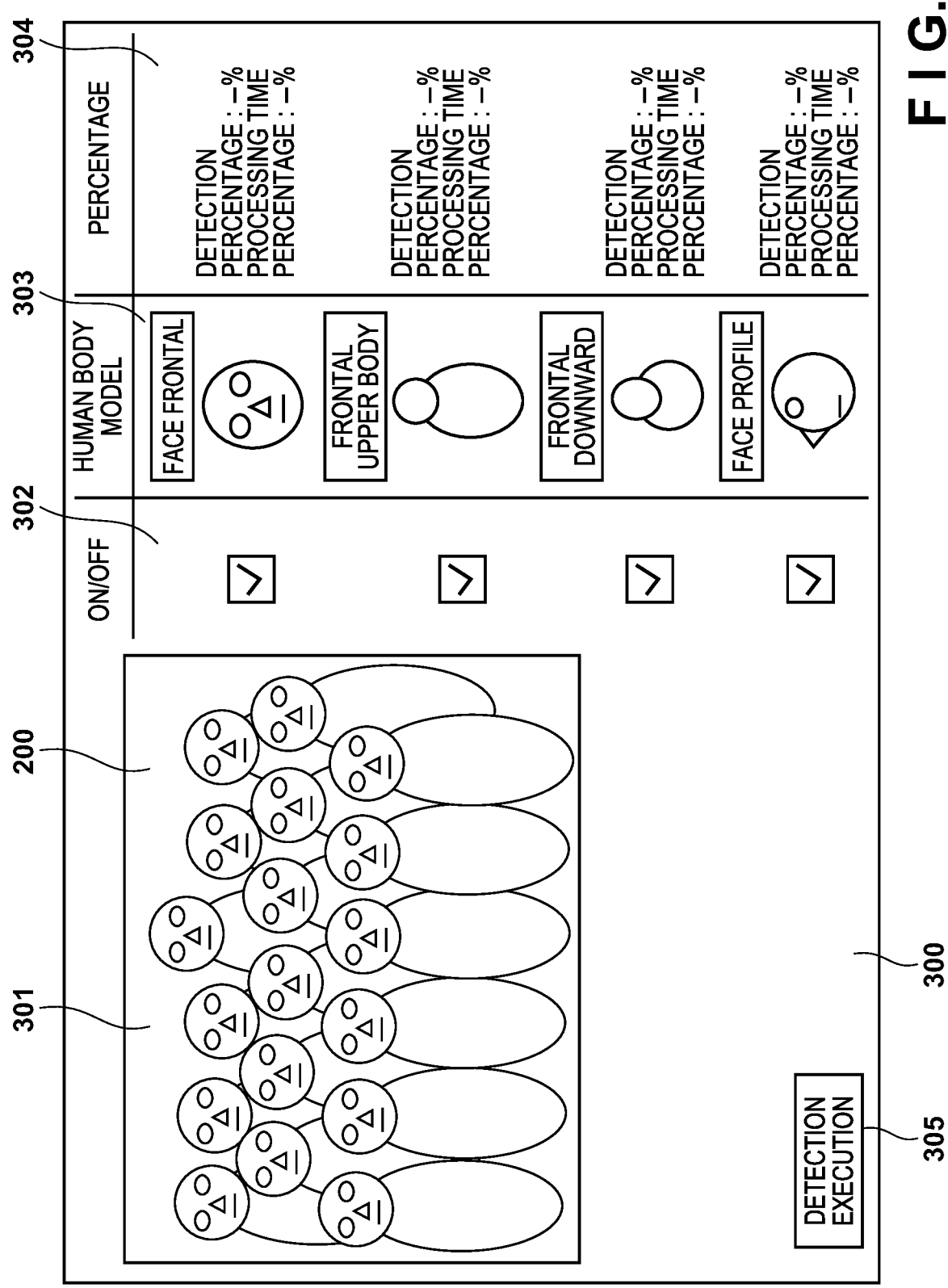
FIG. 6 is a representative screen diagram of a model setting screen that is initially displayed in the human body model setting step.

FIG. 6 is a representative screen diagram of the model setting screen 300 that is initially displayed in the human body model setting step. The model setting screen 300 displays information representing each of all or some of the human body models that are registered in the client device 120 in association with the detection result related to that human body model. Note that because human body detection has not been performed at this stage, material information is not included in the detection result. That is, the numerical values of the percentages are blank. The model setting screen 300 is configured such that human body models to be used in human body detection are selectable by the user.

The model setting screen 300 has a target image display region 301, a selection reception region 302, a model display region 303 and a percentage display region 304. The captured image acquired in step S400 (captured image 200 in the example in FIG. 6) is displayed in the target image display region 301. The user may set a detection area for performing human body detection, by operating (enlarging, reducing, clipping, rotating, moving, trimming, etc.) the captured image 200 that is displayed in the target image display region 301. The selection reception region 302 is configured such that a separate designation for use/non-use can be received from the user for each human body model that is registered in the client device 120, and includes a check box for each human body model, for example. Whether or not to use a corresponding human body model in human body detection can be switched by turning the check box ON/OFF. The model display region 303 is configured such that the user is able to individually identify each of the human body model that are registered, and includes a schematic diagram (picture displaying the type of human body model), an icon and a name for each human body model, for example. The percentage display region 304 displays percentages as the detection result for each human body model that is registered. The percentage display region 304 will be discussed later. The selection reception region 302, the model display region 303 and the percentage display region 304 are in tabular form, and the check boxes of the selection reception region 302, the names of the model display region 303 and the percentages of the percentage display region 304 are each displayed in association with a different one of the human body models.

In the example in FIG. 6, the check boxes that are included in the selection reception region 302 are all set to ON by default. The user visually confirms the captured image 200 that is displayed in the target image display region 301 as the detection target, turns OFF (unchecks) the check box corresponding to any unnecessary human body models in the selection reception region 302, and clicks a detection execution button 305.

Returning to FIG. 5, the control unit 121 acquires the human body models that are set as models to be used in detection (step S401). The control unit 121, upon detecting a click on the detection execution button 305, acquires the human body models whose check box in the selection reception region 302 is ON as human body models to be used in detection. If the detection execution button 305 is clicked in the state of FIG. 6, the check boxes for all of the human body models consisting of face frontal, frontal upper body, frontal downward and face profile are ON, and thus human body detection is performed using all of these human body models.

Note that the human body models of face frontal, frontal upper body, frontal downward and face profile correspond to capturing images of the same human body from different viewpoints. Although the present embodiment describes the case where the four human body models of face frontal, frontal upper body, frontal downward and face profile are employed, in other embodiments, other human body models may be used, and all or some of face frontal, frontal upper body, frontal downward and face profile need not be used. That is, the plurality of different object models that are used in detection processing may be a plurality of different object models including at least two object models from among an object model corresponding to a predetermined object facing in a first direction, an object model corresponding to a predetermined object facing in a second direction that is different from the first direction, an object model corresponding to a first portion of a predetermined object, an object model corresponding to a second portion of the predetermined object that differs from the first portion, and an object model corresponding to an entirety of the predetermined object.

The control unit 121 detects human bodies from the captured image 200 displayed in the target image display region 301, using the human body models acquired in step S401 (step S402). In step S402, a well-known human body detection method such as described in Japanese Patent Laid-Open No. 2014-199506, for example, may be used. The control unit 121 performs matching processing with each of the human body models acquired in step S401 on the captured image 200, and detects human bodies. At this time, the control unit 121 may transmit the results of human body detection to another terminal via the network 150, or may control the display device 140 to display the results.

The control unit 121 calculates, for each of the human body models acquired in step S401, the time taken in detection using the human body model (hereinafter, also referred to as the processing time) in the human body detection of step S402 (step S403). The control unit 121 calculates, for each of the human body models acquired in step S401, the number of human bodies detected from the captured image 200 (hereinafter, also referred to as the detection number) by matching with the human body model (step S404). The control unit 121 totals the processing times across all of the human body models, and calculates a total time (step S405). The control unit 121 totals the detection numbers across all of the human body models, and derives a total number (step S406). The control unit 121 calculates, for each of the human body models acquired in step S401, the percentage of the processing time of the human body model calculated in step S403 relative to the total time calculated in step S405 (step S407). The percentage of the processing time is, for example, derived by: processing time/total time. The control unit 121 calculates, for each of the human body models acquired in step S401, the percentage of the detection number of the human body model calculated in step S404 relative to the total number calculated in step S406 (step S408). The percentage of the detection number is, for example, derived by: detection number/total number.

The display control unit 125 controls the display device 140 to display a model setting screen 500 updated using the results of human body detection (step S409). In particular, the model setting screen 500 displays, for each human body model, the percentages derived in steps S407 and S408.

Figure 7:
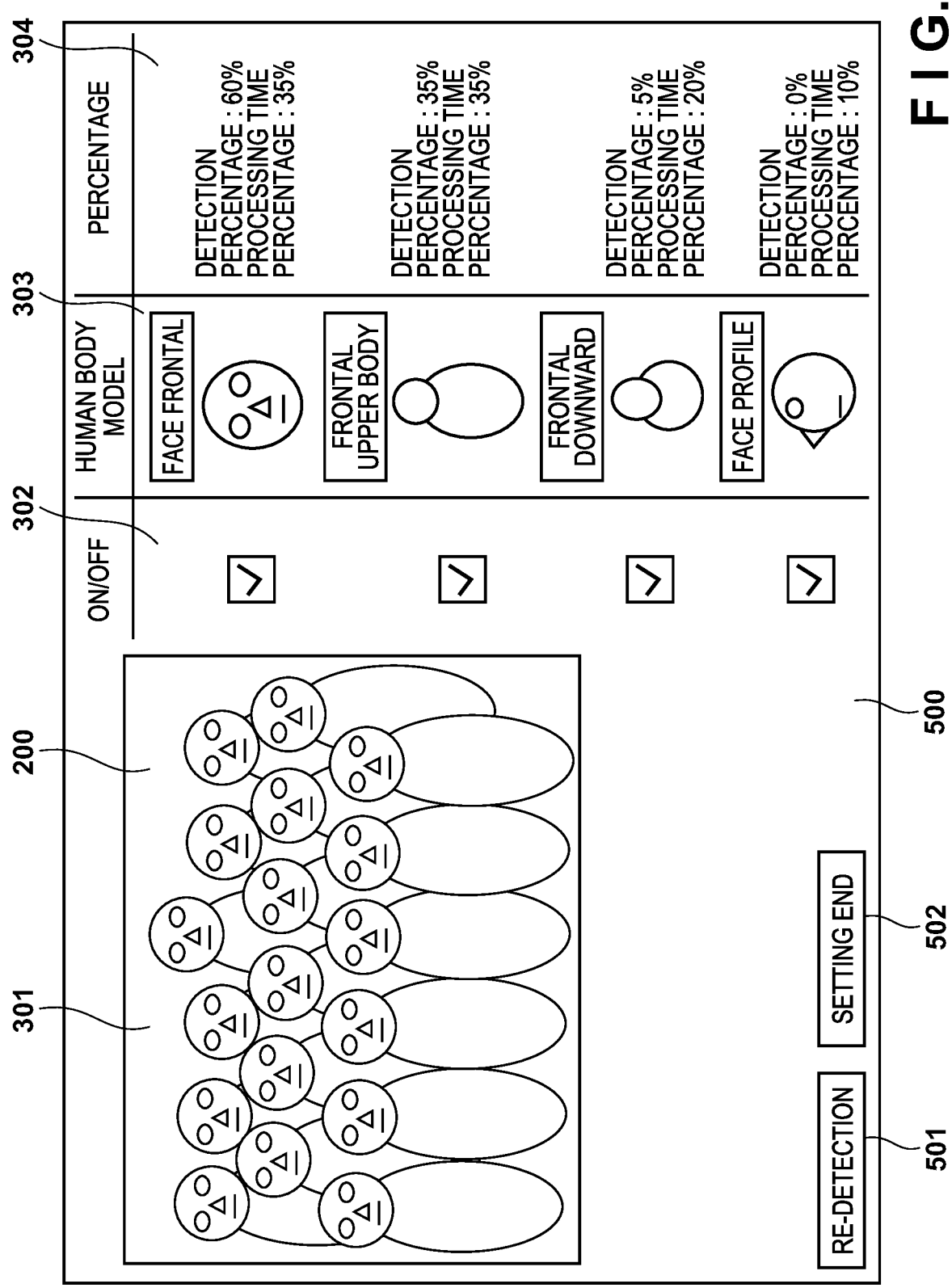
FIG. 7 is a representative screen diagram of an updated model setting screen.

FIG. 7 is a representative screen diagram of the updated model setting screen 500. Compared with the model setting screen 300 shown in FIG. 6, the updated model setting screen 500 has a re-detection button 501 and a setting end button 502 instead of the detection execution button 305. Also, the detection results are reflected in the display contents of the percentage display region 304. Specifically, the percentage display region 304 displays, for each human body model, the percentage of the processing time calculated in step S407 and the percentage of the detection number calculated in step S408.

Looking at the percentage (5%) of the detection number of the frontal downward human body model and the percentage (0%) of the detection number of the face profile human body model, it is evident that the percentage of the detection number of these human body models is comparatively low, and that the contribution to the detection number of these human body models is consequently low. Also, looking at the percentage (20%) of the processing time of the frontal downward human body model and the percentage (10%) of the processing time of the face profile human body model, it is evident that the percentage of the processing time of these human body models is higher than the detection number. That is, with regard to these human body models, it is evident that processing time is long relative to the detection number.

In view of this, in the present embodiment, the user judges the frontal downward human body model and the face profile human body model to be inefficient and unnecessary, and inputs an instruction to remove these human body models from the human body models for human body detection. Specifically, the user, using the input device 130, clicks and thereby turns OFF the check box of the selection reception region 302 corresponding to the frontal downward human body model and the face profile human body model. In other embodiments, the user may turn OFF the check boxes corresponding to other human body models, or may keep the frontal downward human body model and the face profile human body model by not turning OFF the corresponding check boxes. After turning OFF the check boxes, the user clicks the re-detection button 501.

Returning to FIG. 5, the control unit 121 determines whether there has been a change to the human body models to be used in human body detection (step S410). The control unit 121 receives selection of a human body model from the user via the model setting screen 500. Specifically, the control unit 121, upon detecting a click on the re-detection button 501, acquires the human body models whose check box in the selection reception region 302 is ON as the human body models to be used in detection. If the user has updated the check boxes in the selection reception region 302 on the model setting screen 500, the control unit 121 determines that the human body models to be used have been updated (YES in step S410). If it is determined that the human body models to be used have been updated, the control unit 121 sets the human body models selected by the user on the model setting screen 500 as the human body models to be used in subsequent human body detection (step S411). For example, assume that, on the model setting screen 500 in the state shown in FIG. 7, the re-detection button 501 is clicked after turning OFF the two check boxes corresponding to the frontal downward human body model and the face profile human body model. In this case, because the check boxes for the two human body models of face frontal and the frontal upper body are ON, the model setting is changed so that these two human body models are used in subsequent human body detection. After step S411 or in the case where it is not determined that the human body models were updated in S410 (NO in step S410), the control unit 121 determines whether to end the repetition processing (step S412). If it is determined not to end the processing (NO in step S412), the processing returns to step S402.

Figure 8:
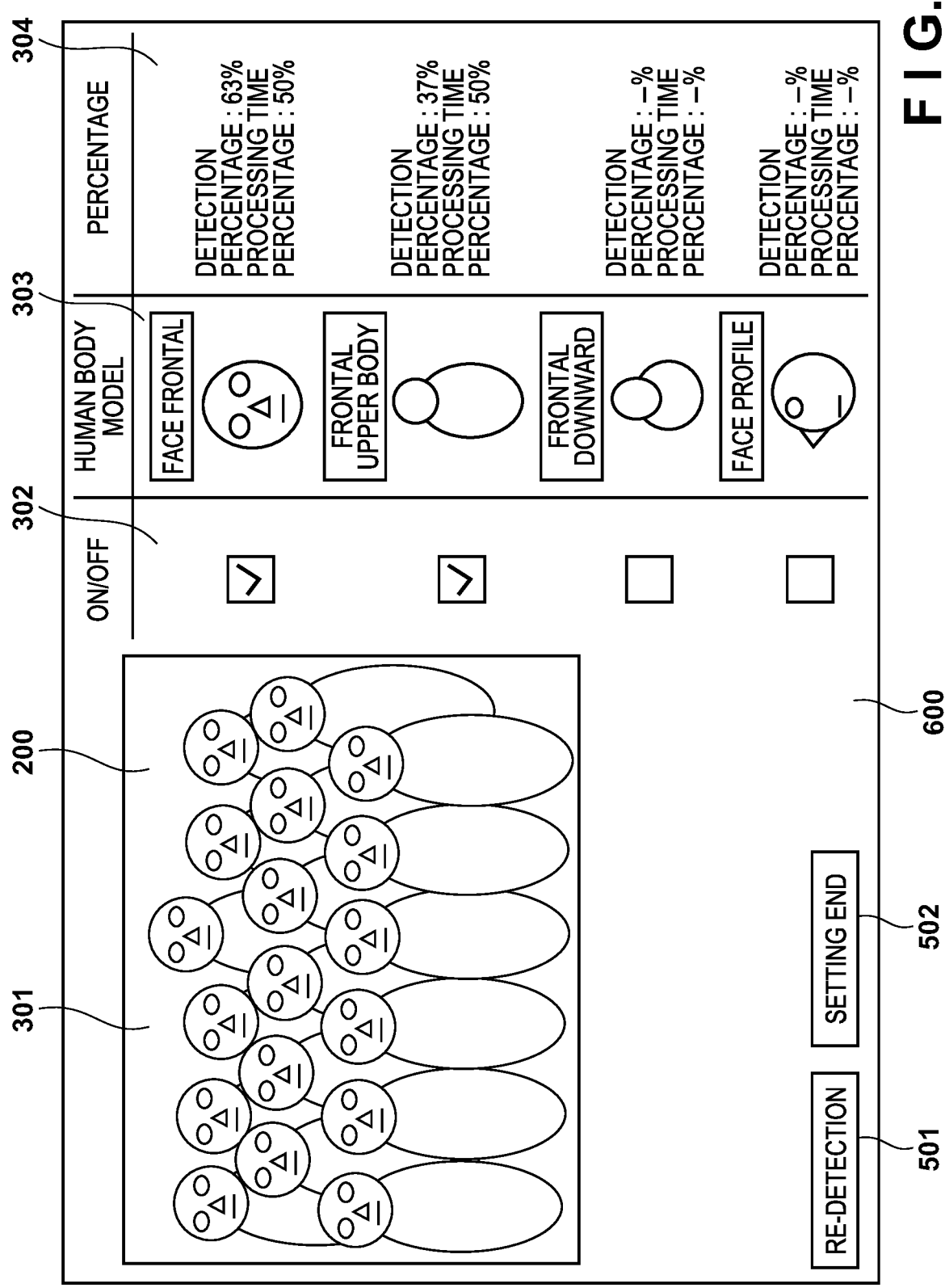
FIG. 8 is a representative screen diagram of a model setting screen that is displayed after turning OFF two check boxes corresponding to a frontal downward human body model and a face profile human body model and clicking a re-detection button.

FIG. 8 is a representative screen diagram of a model setting screen 600 that is displayed after turning OFF the two check boxes corresponding to the frontal downward human body model and the face profile human body model and clicking the re-detection button 501. The model setting screen 600 is displayed in step S409 after turning OFF the two check boxes corresponding to the frontal downward human body model and the face profile human body model and clicking the re-detection button 501. In the selection reception region 302 of the model setting screen 600, the two check boxes corresponding to the frontal downward human body model and the face profile human body model are OFF.

According to the image analyzing device of the present embodiment, it becomes easy for the user to appropriately select human body models to be used in human body detection in accordance with the use scene, and the balance between accuracy and speed can be easily adjusted. Also, because use or non-use can be set for each human body model, setting can be performed with a high degree of freedom.

Although the present embodiment describes the case where the user is made to set human body models via the model setting screens 300, 500 and 600, in other embodiments, the user may be made to set human body models with other methods. Although the present embodiment describes the case where check boxes are used in order to select ON/OFF of each human body model, in other embodiments, the user may be made to select human body models with other methods. Although the present embodiment describes the case where corresponding human body models are set as models to be used in human body detection when the check boxes thereof are ON, the present invention is not limited thereto. In particular, corresponding human body models may, conversely, be set as models not to be used in human body detection when the check boxes thereof are ON. Alternatively, means for selecting only detection or non-detection of certain human body models may be used. One example involves selecting human body models to be set to non-detection with a radio button.

Although the present embodiment describes the case where the percentage of the detection number is employed as information indicating the number of human bodies detected from the captured image 200 by matching with human body models, the present invention is not limited thereto, and the detection number itself or a stepwise display (e.g., five-step display, heat map, etc.) may be employed. Also, although the present embodiment describes the case where the percentage of the processing time is employed as information indicating the time taken in detection that uses human body models, the present invention is not limited thereto, and the processing time itself or a stepwise display may be employed.

Although the present embodiment describes the case where the percentage of the detection number and the percentage of the processing time are numerically displayed, the present invention is not limited thereto, and the percentages may be displayed as grayscale images or the display color may be changed according to the percentage.

Second Embodiment

In the first embodiment, the percentage of the processing time and the percentage of the detection number are displayed for each human body model, and the user views the percentages for each human body model, and selects which human body models to use in human body detection. While this enables precise judgment by the user, it is necessary to view the percentage of the processing time and the percentage of the detection number of all of the human body models, and there is a risk of burdening the user. In view of this, in a second embodiment, the user is notified using the percentage of the detection number for each human body model.

The client device according to the second embodiment, in the case where the detection result related to a human body model meets a predetermined exclusion candidate criterion, notifies the user in a manner in which the human body model is identifiable. Here, the exclusion candidate criterion is met in the case where the percentage of the detection number is less than a threshold set for each human body model, but other criteria may be used. For example, a statistical value of the percentage of the detection number may be compared with a threshold, or the detection number itself may be compared with a threshold. Alternatively, criteria that are based on the percentage of the detection number and the percentage of the processing time may be used. For example, the user is notified if the percentage of the detection number is smaller than a first threshold, but as exception processing, a configuration may be adopted in which the user is not notified even if the percentage of the detection number is smaller than the first threshold, as long as the percentage of the processing time is smaller than a second threshold.

Figure 9:
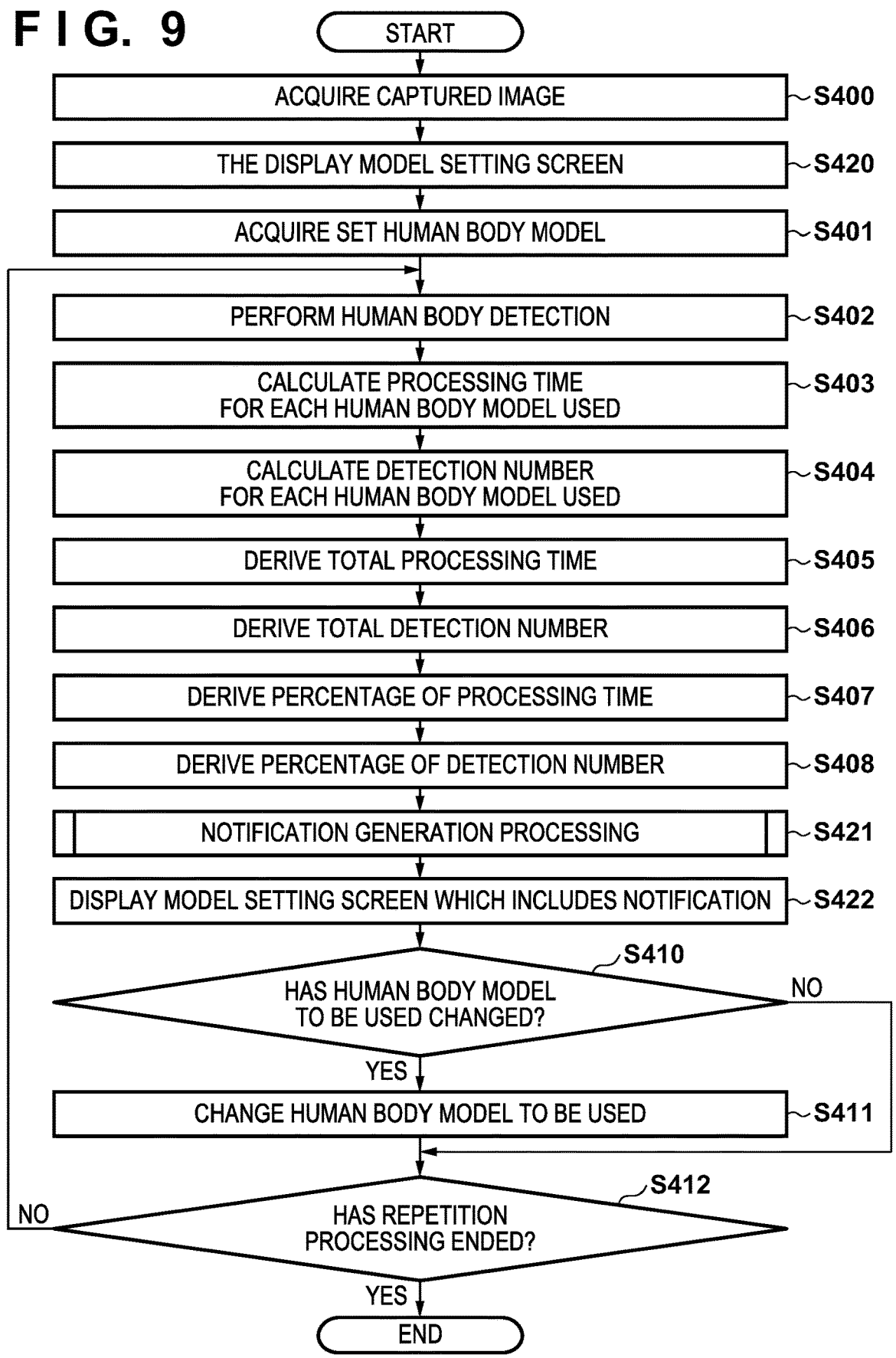
FIG. 9 is a flowchart showing the flow of a series of processing in a human body model setting step according to a second embodiment.

FIG. 9 is a flowchart showing the flow of a series of processing in the human body model setting step according to the second embodiment. The control unit 121 of the client device according to the present embodiment calculates the percentage of the detection number for each of the human body models acquired in step S401 (step S408). The control unit 121 performs notification generation processing for generating a notification in the case where the percentage of the detection number calculated in step S408 is smaller than a threshold (step S421). The display control unit 125 controls the display device 140 to display a model setting screen that was updated using the results of human body detection and includes the generated notification (step S422).

Figure 10:
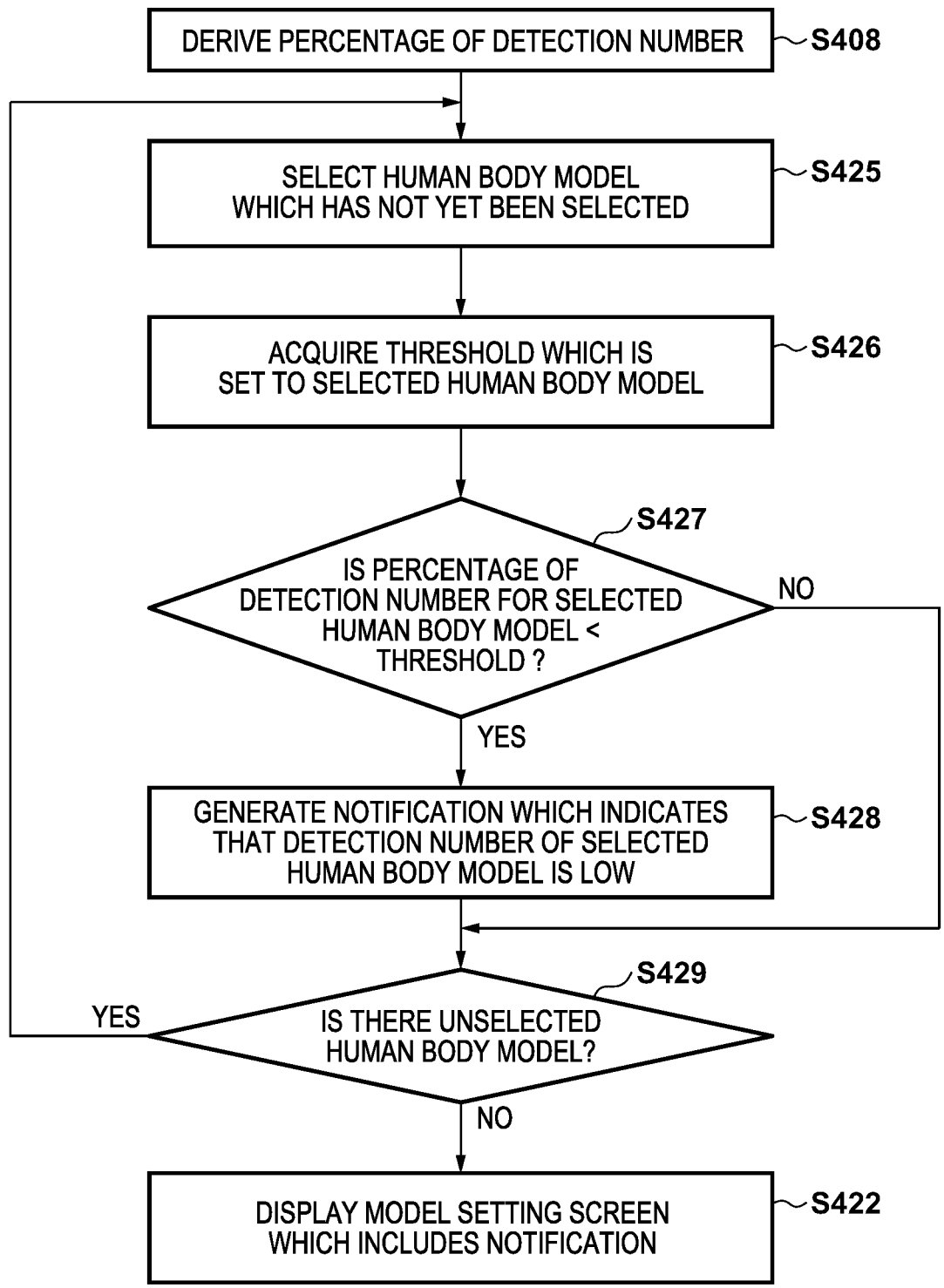
FIG. 10 is a flowchart showing the flow of a series of processing in notification generation processing in FIG. 9.

FIG. 10 is a flowchart showing the flow of a series of processing in the notification generation processing of S421 in FIG. 9. The control unit 121 selects one human body model that has not yet been selected for threshold comparison, among the human body models acquired in step S401 (step S425). The control unit 121 acquires the threshold of the percentage of the detection number that is set for the human body model selected in step S425 (step S426). The threshold may be set by a user input via a graphical user interface. In the present embodiment, the threshold is uniformly set at 5% irrespective of the human body model. In other embodiments, the threshold may be other values, and may differ for each human body model.

The control unit 121 compares the percentage of the detection number calculated in step S408 for the human body model selected in step S425 with the threshold acquired in step S426 (step S427). In the case where the percentage of the detection number is less than the threshold (YES in step S427), the control unit 121 generates a notification, that is, a dialog, to be included in the model setting screen (step S428). This dialog shows that the detection number of the selected human body model is low. Note that although the present embodiment describes the case where the user is notified using a dialog, in other embodiments, the user may be notified using other methods. Although the present embodiment describes the case where the user is notified immediately, in other embodiments, the time until notification may be set. Although, in the present embodiment, the user is notified in the case where the percentage of the detection number for a human body model is less than the threshold set for that human body model, in other embodiments, different conditional determinations may be employed.

The control unit 121 determines whether there is an unselected human body model (step S429). If there is an unselected human body model (YES in step S429), the processing returns to step S425, and if there is not (NO in step S429), the processing advances to step S422.

Figure 11:
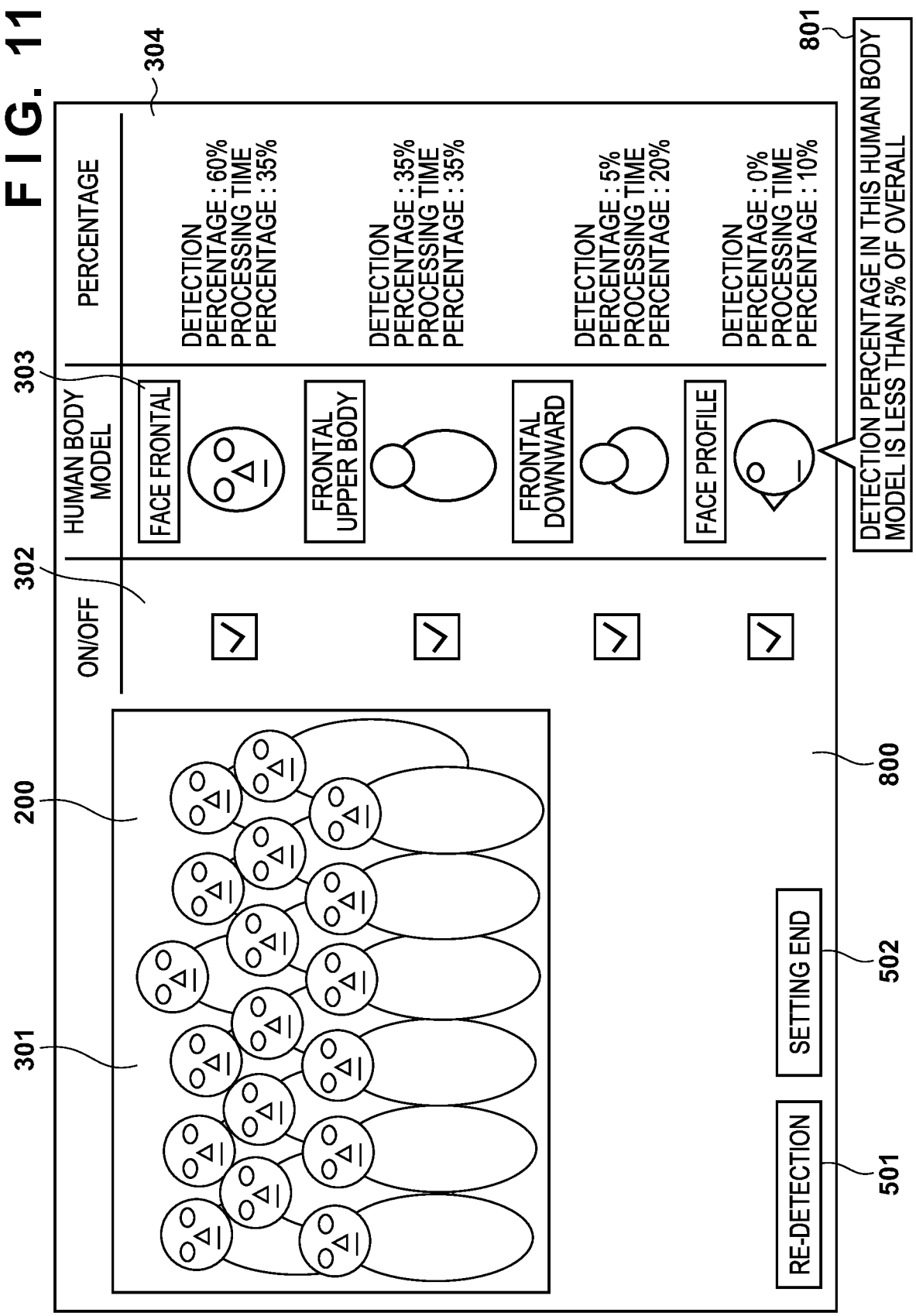
FIG. 11 is a representative screen diagram of an updated model setting screen that includes a notification.

FIG. 11 is a representative screen diagram of an updated model setting screen 800 that includes a notification. On the model setting screen 800, a dialog 801 is displayed in a manner in which the human body model (face profile human body model) that is the notification target is identifiable, and the remaining display is similar to the model setting screen 500 shown in FIG. 7. In the example illustrated in FIG. 11, the face profile human body model is the only human body model for which the percentage of the detection number is less than the threshold, and thus the dialog 801 is only displayed for the face profile human body model.

According to the client device of the present embodiment, similar operation and effects are achieved to the operation and effects that are achieved by the client device 120 according to the first embodiment. In addition, note that displaying the dialog 801 enables the user to quickly identify human body models for which a detection number is low.

Although the first and the second embodiments describe the case where the object to be detected is a human body, the present invention is not limited thereto, and the technical idea according to these embodiments can also be applied in the case of detecting objects other than human bodies such as vehicles or animals, for example.

The configuration and operations of a client device according to the embodiments is described above. These embodiments are illustrative, and a person skilled in the art will understand that various variations can be made through a combination of the respective constituent elements and respective processing of the embodiments, and that such variations are also within the scope of the invention.

Figure 12:
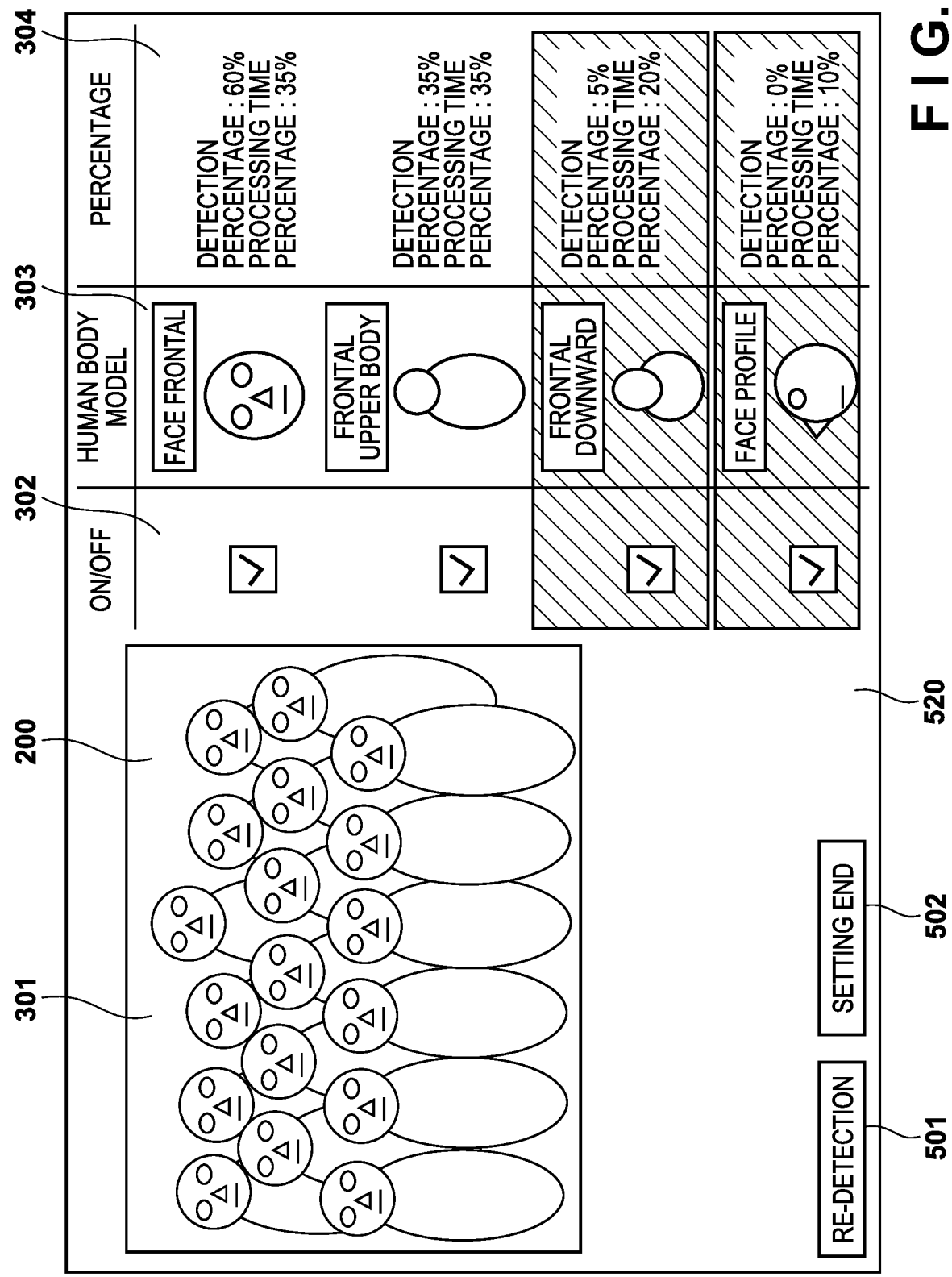
FIG. 12 is a representative screen diagram of a model setting screen according to a first variation.

A variation of the updated model setting screen 500 shown in FIG. 7 will be described. FIG. 12 is a representative screen diagram of the model setting screen 520 according to a first variation. On the model setting screen 520, the human body models that meet a predetermined highlighted display criterion are displayed in a highlighted manner. The highlighted display criterion corresponds to the abovementioned exclusion candidate criterion. In the example of FIG. 12, the percentage of the detection number is smaller than 10% for the frontal downward human body model and the face profile human body model, and thus these human body models are displayed in a highlighted manner with hatched lines. Other modes of highlighted display include changing the color or changing the shading. According to this example, the user is able to quickly identify human body models for which the detection number is low.

Figure 13:
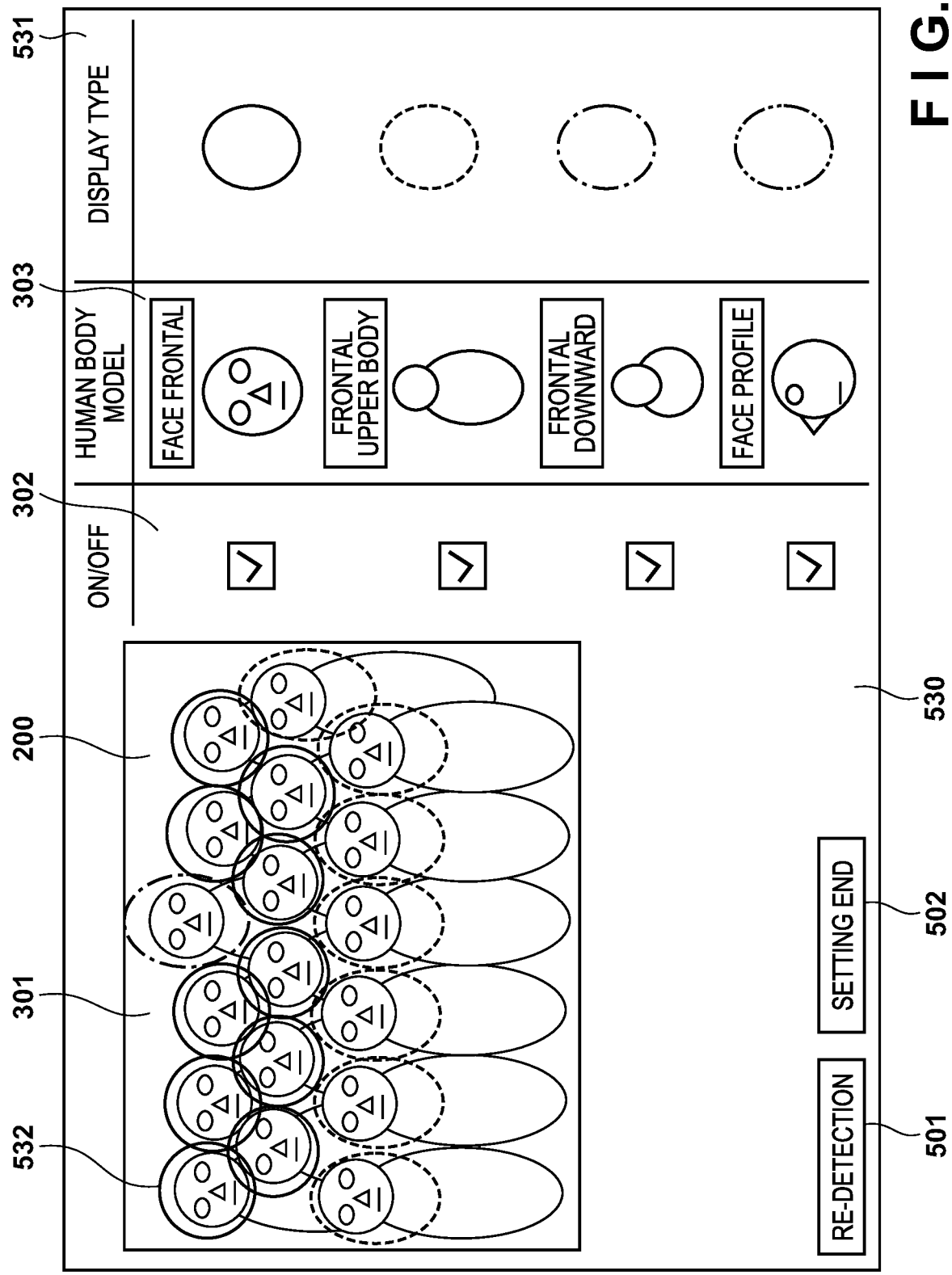
FIG. 13 is a representative screen diagram of a model setting screen according to a second variation.

FIG. 13 is a representative screen diagram of a model setting screen 530 according to a second variation. The model setting screen 530 has a display type 531 instead of the percentage display region 304. The display type 531 displays the type of mark corresponding to each human body model. In the example in FIG. 13, the display type 531 shows that an encircling mark consisting of a solid line is given to human bodies detected with the face frontal human body model, an encircling mark consisting of a dashed line is given to human bodies detected with the frontal upper body human body model, an encircling mark consisting of a one-dot chain line is given to human bodies detected with the frontal downward human body model, and an encircling mark consisting of a two-dot chain line is given to human bodies detected with the face profile human body model. In the target image display region 301, marks 532 that are based on the result of human body detection are displayed on the captured image 200 in a superimposed manner. According to this example, the user is able to quickly grasp the result of the human body detection for each human body model. Also, the user is able to grasp the application situation of the human body models from the reference signs 532, and is able to appropriately perform selection of human body models to be used according to the application situation.

In another variation, if human bodies detected using human body models that are notification targets appear in the captured image 200 on the model setting screen 800 shown in FIG. 11, those human bodies may be displayed in a highlighted manner or may be given a mark in the target image display region 301. Alternatively, a button for switching the human body models ON/OFF may be added to the dialog 801.

The functions and configuration of the image capturing device 110 may be implemented in an image capturing device as software configuration that is realized by the CPU 12 executing processing based on programs stored in the memory 13. Also, the functions and configuration of the image capturing device 110 may be wholly or partially implemented in the image capturing device 110 as hardware configuration. Similarly, the functions and configuration of the client device 120 may be implemented in the client device 120 as a software configuration that is realized by the CPU 22 executing processing based on programs stored in the memory 21. Also, the functions and configuration of the client device 120 may be wholly or partially implemented in the client device 120 as hardware configuration. Also, the abovementioned hardware configuration of the client device and the image capturing device are exemplary, and a plurality of CPUs, memories, communication I/Fs and the like may be provided, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-023407, filed Feb. 13, 2018, which is hereby incorporated by reference herein in its entirety.

What is claimed is:

1. An image analyzing device comprising a computer executing instructions that, when executed by the computer, cause the computer to function as:
   a detection unit configured to execute detection processing for detecting a predetermined object in an image captured by an imaging unit, by using at least a first object model and a second object model different from the first object model, wherein the first object model and the second object model are used for detecting the predetermined object in the image;
   a display control unit configured to cause a display unit to display a setting screen including information indicating the first object model, information indicating the second object model, information related to a result of the detection processing using the first object model in the image, information related to a result of the detection processing using the second object model in the image, information related to a first time period required for the detection processing using the first object model in the image, and information related to a second time period required for the detection processing using the second object model in the image; and
   a setting unit configured to set, based on a user designation for selecting at least one of the first object model and the second object model in the setting screen, an object model to be used for the detection processing in an image captured by the imaging unit.

2. The image analyzing device according to claim 1, wherein the setting unit sets a selected object model, based on the user designation, as an object model to be used in the detection processing to be executed subsequently by the detection unit.

3. The image analyzing device according to claim 1, wherein the information related to the result of the detection processing using the first object model in the image is corresponding to a number of objects detected in the detection processing using the first object model from the image, and
   wherein the information related to the result of the detection processing using the second object model in the image is corresponding to a number of objects detected in the detection processing using the second object model from the image.

4. The image analyzing device according to claim 1, further comprising a notification unit configured to, in a case where the result of the detection processing related to at least one object model among the first object model and the second object model meets a predetermined criterion, perform a notification in a manner in which the at least one object model is identifiable.

5. The image analyzing device according to claim 1, wherein the predetermined object is a human body.

6. The image analyzing device according to claim 1, wherein the first object model and the second object model are object models among an object model corresponding to the predetermined object facing in a first direction, an object model corresponding to the predetermined object facing in a second direction different from the first direction, an object model corresponding to a first portion of the predetermined object, an object model corresponding to a second portion of the predetermined object different from the first portion, and an object model corresponding to an entirety of the predetermined object.

7. An image analyzing method comprising:
  executing detection processing for detecting a predetermined object in an image captured by an imaging unit, by using at least a first object model and a second object model different from the first object model, wherein the first object model and the second object model are used for detecting the predetermined object in the image;
  causing a display unit to display a setting screen including information indicating the first object model, information indicating the second object model, information related to a result of the detection processing using the first object model in the image, information related to a result of the detection processing using the second object model in the image, information related to a first time period required for the detection processing using the first object model in the image, and information related to a second time period required for the detection processing using the second object model in the image; and
  setting, based on a user designation for selecting at least one of the first object model and the second object model in the setting screen, an object model to be used in the detection processing in an image captured by the imaging unit.

8. A non-transitory computer-readable storage medium storing a computer program for causing a computer to execute a method, the method comprising:
  executing detection processing for detecting a predetermined object in an image captured by an imaging unit, by using at least a first object model and a second object model different from the first object model, wherein the first object model and the second object model are used for detecting the predetermined object in the image;
  causing a display unit to display a setting screen including information indicating the first object model, information indicating the second object model, information related to a result of the detection processing using the first object model in the image, information related to a result of the detection processing using the second object model in the image, information related to a first time period required for the detection processing using the first object model in the image, and information related to a second time period required for the detection processing using the second object model in the image; and
  setting, based on a user designation for selecting at least one of the first object model and the second object model in the setting screen, an object model to be used for the detection processing in an image captured by the imaging unit.

* * * * *